US008510262B2

(12) United States Patent
Aggarwal et al.

(10) Patent No.: US 8,510,262 B2
(45) Date of Patent: Aug. 13, 2013

(54) PROMOTING WEBSITES BASED ON LOCATION

(75) Inventors: Amit Aggarwal, Redmond, WA (US); Nitin Agrawal, Redmond, WA (US); Michael Maxwell Cameron, Redmond, WA (US); Nicholas Eric Craswell, Cambridge (GB); Nikhil Bharat Dandekar, Bellevue, WA (US); Tabreez Govani, Mukilteo, WA (US); Hugh Evan Williams, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 687 days.

(21) Appl. No.: 12/124,975

(22) Filed: May 21, 2008

(65) Prior Publication Data
US 2009/0292684 A1 Nov. 26, 2009

(51) Int. Cl.
*G06F 7/00* (2006.01)
*G06F 17/00* (2006.01)

(52) U.S. Cl.
USPC .......... 707/603; 707/708; 707/723; 707/741; 707/771

(58) Field of Classification Search
None
See application file for complete search history.

(56) References Cited

U.S. PATENT DOCUMENTS

| | | | | |
|---|---|---|---|---|
| 5,920,859 | A * | 7/1999 | Li | 715/205 |
| 6,037,935 | A * | 3/2000 | Bates et al. | 715/760 |
| 6,754,873 | B1 * | 6/2004 | Law et al. | 715/208 |
| 6,766,370 | B2 | 7/2004 | Glommen | |
| 6,957,390 | B2 | 10/2005 | Tamir | |
| 7,058,628 | B1 * | 6/2006 | Page | 1/1 |
| 7,711,682 | B2 * | 5/2010 | Zhang | 707/771 |
| 7,792,870 | B2 * | 9/2010 | Field et al. | 707/802 |
| 7,831,545 | B1 * | 11/2010 | Betz | 707/603 |
| 2003/0050906 | A1 * | 3/2003 | Clifton-Bligh | 707/1 |
| 2003/0061232 | A1 * | 3/2003 | Patterson | 707/104.1 |
| 2004/0225687 | A1 | 11/2004 | Larsson | |
| 2005/0010583 | A1 * | 1/2005 | Clifton-Bligh | 707/100 |
| 2005/0071328 | A1 * | 3/2005 | Lawrence | 707/3 |
| 2006/0167913 | A1 | 7/2006 | Tam | |
| 2006/0218151 | A1 * | 9/2006 | Adelman et al. | 707/10 |

(Continued)

FOREIGN PATENT DOCUMENTS
GB EP1120722 A3 8/2001

OTHER PUBLICATIONS

Reiner Kraft et al., Mining Anchor Text for Query Refinement, 2004, ACM, Proceedings of the 13th International Conference on World Wide Web, pp. 666-674.*

(Continued)

*Primary Examiner* — Pierre Vital
*Assistant Examiner* — Taelor Kim
(74) *Attorney, Agent, or Firm* — Shook, Hardy & Bacon LLP (57) ABSTRACT

A computer system, method, and media for associating locations with ranked websites are provided. The computer system includes a search engine, a log database, and a location database that are employed to respond to search requests from users by returning appropriately ranked websites to the user. The websites are ranked using the location of the website and the location of the user to select websites to receive high ranks. Additionally, the search engine includes a correction feature that reevaluates locations for a website or user when a large number of obtained locations suggest a different location than a currently associated location for the website or the user.

12 Claims, 4 Drawing Sheets

(56) References Cited

U.S. PATENT DOCUMENTS

| | | | |
|---|---|---|---|
| 2007/0094247 A1* | 4/2007 | Chowdhury et al. | 707/4 |
| 2007/0112777 A1* | 5/2007 | Field et al. | 707/10 |
| 2007/0233864 A1 | 10/2007 | Xie | |
| 2007/0239680 A1* | 10/2007 | Oztekin et al. | 707/3 |
| 2007/0250468 A1* | 10/2007 | Pieper | 707/1 |
| 2008/0065631 A1* | 3/2008 | Baeza-Yates et al. | 707/6 |
| 2008/0104055 A1* | 5/2008 | Segel | 707/5 |
| 2008/0162425 A1* | 7/2008 | Grennan et al. | 707/3 |
| 2010/0077098 A1* | 3/2010 | Fox et al. | 709/233 |
| 2010/0262592 A1* | 10/2010 | Brawer et al. | 707/709 |
| 2010/0332583 A1* | 12/2010 | Szabo | 709/202 |

OTHER PUBLICATIONS

"Websites and Personal Information," retrieved date Feb. 28, 2008, 6 pages, http://www.privacy.org.nz/websites-and-personal-information/.

"hi5 Privacy Policy," retrieved date Feb. 28, 2008, 3 pages, http://hi5.com/friend/displayPrivacy.do.

"Country Code Top Level Domains," retrieved date Feb. 28, 2008, 2 pages, Softnik Technologies, http://www.mytoolpad.com/open/kb/whois/cctlds.php.

Lee Wang, et al., "Detecting Dominant Locations from Search Queries," SIGOR'05, Aug. 15-19, 2005, Salvador, Brazil, 8 pages, http://research.microsoft.com/~xingx/QLD.pdf.

* cited by examiner

PROMOTING WEBSITES BASED ON LOCATION

BACKGROUND

Conventionally, a search engine ranks websites based on a frequency of terms within a website that matches the terms included in a user query. The conventional search engine returns the ranked websites as a result set to the user. Additionally, the conventional search engine considers a location of a ranked website to decide whether the ranked website is of interest to the user. For instance, a website operated and located in the United States of America would more likely be of interest to a user in the United States of America accessing the Internet from a machine in the United States of America than a similar website operated and located in a foreign country. The conventional search engine is configured to return, within the top result set, the website operated and located in the United States of America. The similar website located and operated in the foreign country is not returned within the top result set.

The conventional search engine selects a location of a website by parsing a top level domain of a uniform resource locator of the website to extract a country identifier that corresponds to the location of the website. Alternatively, the conventional search engine selects a location of the website by identifying an internet protocol address corresponding to the uniform resource locator. The internet protocol address for the website corresponds to a specific location that is associated with the website.

The conventional search engines introduce errors when selecting top results using location. The conventional search engines erroneously omit a website that is globally popular from the top results set. For example, a website that individuals all over the world frequently access and operated but is located in the United States of America may be erroneously excluded from the top result set for users located in foreign countries. Because the website is operated and located in the United States of America, the conventional search engines erroneously omit websites from the top result set that should be included in the top result set for the foreign countries.

SUMMARY

A computer system includes a search engine that responds to user queries. The search engine receives the user queries and returns a result set that includes websites that match the user query. The search engine is configured with a location service that identifies locations for users and websites. The location service retrieves locations for users and websites from a location database. In turn, the location service uses the locations retrieved from the location database to identify unexpectedly popular websites. Additionally, the location service locates inconsistencies in the locations retrieved from the location database and resolves the inconsistencies in the retrieved locations. The locations selected by the location service for users and websites are used to impact ranks assigned to websites that match the user query. Accordingly, the search engine uses the location service to analyze, among other things, popularity of the websites, locations of the websites, and the locations of the users to generate the top results that are included in the result set.

This Summary is provided to introduce a selection of concepts in a simplified form. The selection of concepts are further described below in the Detailed Description. This Summary is not intended to identify key features or essential features of the claimed subject matter, nor is it intended to be used as an aid in determining the scope of the claimed subject matter.

DETAILED DESCRIPTION

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "anchors" refers to links within the content of a website that point to additional content, such as a website or other multimedia content. Additionally, as utilized herein, the term "component" refers to any combination of hardware, software, or firmware.

A search engine is configured with location services that impact a rank for a website matching a user query. The location service analyzes location data for websites and users to classify websites that are globally popular. Moreover, the location service identifies a location of a website by looking at locations of: users that visit the website; the top-level domain; and the locations of server devices that host the website. In some embodiments, the location service selects a common location associated with a large number of visitors to the website to be the location of the website even if the website is hosted at a different location. Moreover, the location service may identify a website as globally popular when users all over the world frequently access the website.

In some embodiments, the location service includes a User Location Bias (ULB) component to affect the rankings for websites that match the user query. The ULB component identifies websites that are unexpectedly popular for a location associated with the website. The unexpectedly popular websites are returned to the search engine for inclusion in the top result set generated by the search engine in response to the user query. When the search engine includes the unexpectedly popular websites in the top results, the rank for the unexpectedly popular websites are updated to reflect its position in the top result set. Alternatively, the location service may use static location sources to impact the rank for each website that is a candidate for the top result set.

Additionally, the location service includes a correction component that identifies inconsistencies between locations for websites received from a location database and locations for website assigned by the location service. The inconsistencies between the locations for websites are resolved by the correction component based on locations for users. Alternatively, the correction component identifies inconsistencies between location for users received from a location database and locations for users assigned by the location service, and the inconsistencies between the locations for users is resolved based on locations for websites accessed by the users.

Figure 1:
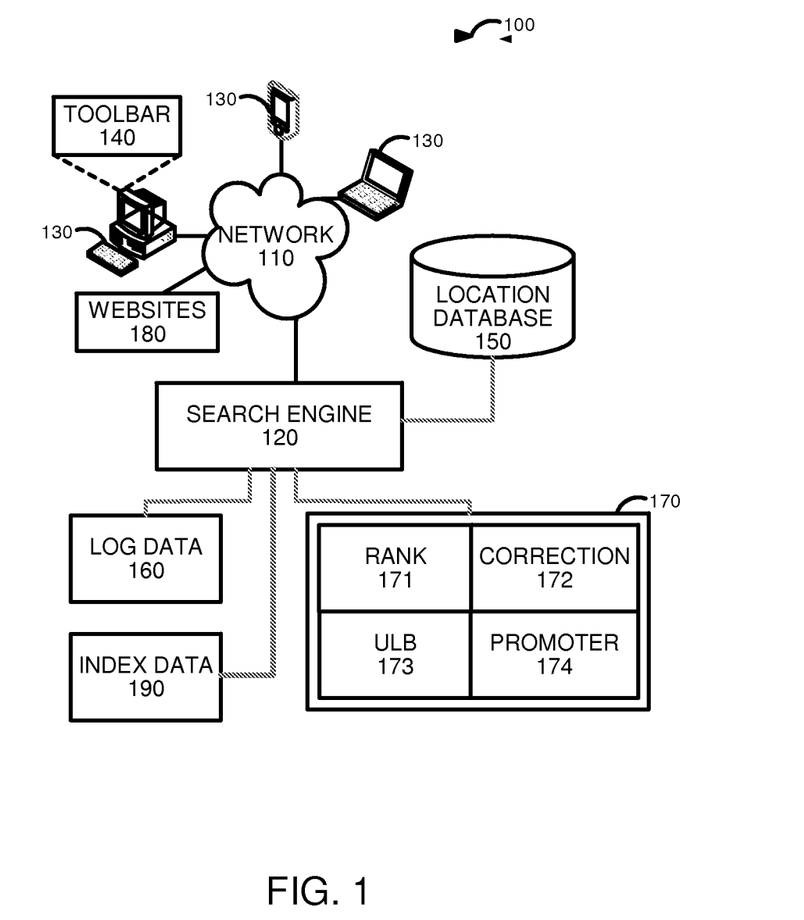
FIG. 1 is a network diagram that illustrates an exemplary operating environment.

FIG. 1 is a network diagram that illustrates an exemplary operating environment 100. The operating environment 100 includes a network 110, a search engine 120, client devices 130 configured with search toolbars 140, and location database 150, log data 160, location service 170, and websites 180, and index data 190.

The websites 180 are documents that represent HyperText Markup Language pages or other content. The websites 180 are addressed using uniform resource locators. Additionally, the websites 180 include anchors that link to other websites or additional content. In an embodiment, the websites 180 may be formatted in extensible markup language or any other markup language.

The network 110 is configured to facilitate communication between the client devices 130 and the search engine 120. The network 110 may be a communication network, such as a wireless network, local area network, wired network, or the Internet. In an embodiment, the client devices 130 communicate search queries to the search engine 120 utilizing the network 110. In response, the search engine 120 may communicate result sets having websites that match terms included in the search requests.

The search engine 120 is a computing device that provides search results in response to search queries. In some embodiments, the search engine 120 is configured to execute on a server device. The search engine 120 receives search queries from the client devices 130. The search queries are processed by the search engine 120 to identify websites 180 that match terms included in the search queries. Additionally, the search queries are processed by the search engine 120 to traverse the location database 150 to identify locations for the client devices 130 that transmitted the search queries to the search engine 120. In turn, the search engine 120 transmits search results that include the websites that match the terms included in the search queries received from the client devices 130.

In certain embodiments, the client devices 130 may transmit user activity logs, such as, but not limited to, tool bar logs, to the search engine 120. The search toolbar 140 is a utility installed on the client devices 130. The search toolbar 140 logs and track the user's visits to websites 180 on the network 110, submits the user activity logs having websites visited by the user to the search engine 120, and submits an internet protocol address of the client devices 130 to the search engine 120. In certain embodiments, the search toolbar 140 is a component of the user's web browser that logs browse activity for every website 180 that the user visits. Essentially, the user activity logs identify each page that the user visits, the user's internet protocol address, and other important browse activity. The user activity logs received from the client devices 130 are used by the search engine 120 to identify locations for users, to identify locations for websites, and to impact a rank of websites that match terms included in user search queries in accordance with analysis performed by the location service 170 of the search engine 120.

The location database 150 is a database the stores location data for websites and users. In some embodiments, the location database is a lookup table having location data and internet protocol address data. For each uniform resource locator, website, and internet protocol address, the lookup table includes a corresponding location. The location may specify the country, state, or municipality for a website having the specified uniform resource locator. The lookup table includes entries having an internet protocol address and corresponding location. For instance, the lookup table may store uniform resource locator "www.va.com.au" having internet protocol address 130.194.1.99 that corresponds to a machine located in Clayton, Victoria, Australia. The location database 150 may return the location for a website or a user based on the internet protocol address received from the search engine 120. In some embodiments, the location database 150 may be updated and maintained by a third-party. For instance, the third-party may be Quova$^{SM}$.

The log data 160 is a database that stores browse activity, such as query-click activity observed by the search engine 120. The query-click activity includes records queries that the user issues to the search engine 120 and records of clicks a user initiates on results returned by the search engine 120. Additionally, the log data 160 stores the browse activity collected from the search toolbar 140. The toolbar logs from the client devices 130 are stored in the log data 160. The index data 190 stores data for each website indexed by the search engine. The index data 190 allows the search engine to quickly compare search terms received from the user to the terms in the index 190 to find matches that are returned as a set of websites 180 that match the search terms. The index data 190 stores, among other things, uniform resource locators that correspond to each website associated with the anchors.

The search engine 120 is configured with location service 170. The location service 170 generates a location profile for a user or a website based on the log data 160. The location service 170 also impacts ranks for the websites, suggests corrections to locations obtained from the location database 150, and promotes a website within the search results returned to a user of the search engine based on the location profile for the user and the website. The location service 170 comprises a rank component 171, a correction component 172, a ULB component 173, and a promoter component 174.

The rank component 171 generates a rank for each website 180 that matches the terms included in the user search query. The rank component 171 assigns a rank to each website 180 based on multiple factors. In some embodiments, the rank component 171 performs a statistical analysis on the terms in the search query and the terms in website 180. The larger a statistical overlap between terms in the search query and the terms in the website 180, the higher the rank. Additionally, the rank component 171 evaluates the location of the website and the location of the user to assign the appropriate rank to the website 180.

The correction component 172 locates inconsistencies in the locations obtained from the location database 150 and corrects the inconsistencies based on the aggregate locations observed for users or websites 180. For instance, the location database 150 may return the United States of America as a location for a user based on internet protocol address sent to the location database 150 from the search engine 120. However, after the correction component 172 observes the browse activity stored in the log data 160 for the user, the correction component 172 determines that 90% of websites visited by the user are located in Great Britain. Based on this information, the correction component 172 changes the location of the user from the United Stated of America to Great Britain.

The correction component 172 performs a similar process to correct locations for websites 180. For instance, the location database 150 may return France as a location for a website based on an internet protocol address of the uniform resource locator sent to the location database 150 from the search engine 120. However, after the correction component 172 observes the browse activity stored in the log data 160 for the website, the correction component 172 determines that 90% of the users visiting the website are located in the United States of America. Based on this information, the correction component 172 changes the location of the website from France to the United States of America.

Additionally, the correction component 172 classifies the websites 180 or users based on expected global statistical distribution of websites 180. The correction component may use Kullback-Leibler (KL) divergence values received from the ULB component 173 to identify the appropriate location for a website. For instance, the correction component 172 may observe a particular user has the following distribution of websites: 40% of the websites visited by the user are in the United States of America; 40% of the websites visited by the user are in Great Britain; and 20% of the website are located elsewhere. The correction component 172 compares the user's distribution of websites to an expected distribution of all websites on the Internet. The correction component 172 aggregates the number of websites in the United States of America, the number of websites in Great Britain, and each of the remaining countries in the world. In turn, the correction component 172 compares the global distribution to the user distribution. For instance, if the global distribution of websites was the following: 40% of all websites are in the United States of America; 40% of all websites are in the Great Britain; and the remaining websites are distributed among other countries in the world, the correction component 172 is unable to suggest a correction for the location of the user, and the location obtained from the location database 150 is used to classify the user. However, if the user distribution indicated that 70% of the websites visited by the user are in Great Britain and only 5% of websites are located in the United States of America, the correction component 172 classifies the user as being located in Great Britain. The correction component 172 uses the log data 160, the location database 150, or the KL values to assign the user with an appropriate location. In some embodiments, the correction component 172 uses the anchors pointing to the website to obtain a location classification for a website 180. Generally, the location of the anchor corresponds to location of the website that the anchor points to. For instance, if a website contains a disproportionately large number of anchors having a location of Great Britain but the website is classified as having France as the location, the correction component 172 updates the location from France to Great Britain. In some embodiments, the correction component 172 may assign priorities to locations received from the location database 150, locations suggested by the correction component 172, and locations suggested by the ULB component 173.

The ULB component 173 impacts the rank assigned to a website. The ULB component calculates the Kullback-Leibler Divergence to find websites that are disproportionately popular at a specified locations:

$$KL(W, L) = P(W, L) \cdot \log\left(\frac{P(W, L)}{P(L)}\right).$$

The "W" represents a website, the "L" represents a location, "P(W,L)" represents the probability that a user is accessing a website "W" from location "L," and "P(L)" represents the probability that a user accessing any website is from location "L." The ULB component 173 analyzes the log data 160 to calculate P(W,L) and P(L). The ULB component 173 uses the log data 160 to identify, for each website "W," location "L" where the website "W" is highly popular. The ULB component 173 calculates the number of users who visit each website "W" from each location "L" based on the log data 160 and location information provided by the location database 150. For example, the log data 160 for website: www.whistlerblackcomb.com may indicate the following:

USA=50,000; Canada=40,000; Australia=50; Germany=40; Ireland=10.

In other words of the total 90,100 users that visit the website www.whistlerblackcomb.com, 50,000 users are located in the United States of America, 40,000 users are located in Canada, 50 users are located in Australia, 40 users are located in Germany, and 10 users are located in Ireland.

In turn, the ULB component 173 calculates the following probability value:

$$P(www.whstlerblackcomb.com, USA) = \frac{50,000}{90,100} = .5549.$$

Additionally, the log data 160 and locations from the location database 150 may indicate that 30% of all users of the search engine and toolbar are located in the United States of America. The ULB component 173 calculates the probability value for a user of the search engine as:

$P(USA)=0.30.$

The ULB component 173 uses P(USA) and P(www.whistlerblackcomb.com, USA) to calculate KL(www.whistlerblackcomb.com, USA), which provides an indication of when a website is unusually popular.

$$KL(www.whistlerblackcomb.com, USA) = 0.5549 \cdot \log\left(\frac{0.5549}{0.3}\right) = 0.34KL$$

After evaluating KL(www.whistlerblackcomb.com, USA), the ULB component 173 may compare the KL divergence value to a threshold value, i.e., 0.25, to determine whether the website is unusually popular for the specified location. A high KL divergence value indicates that the website www.whistlerblackcomb.com is unusually popular in this location (USA).

The KL value compares what the ULB component 173 expects for website usage to what the ULB component 173 observes for a particular website and location. Generally, the KL value is a large number when the ULB component 173 observes a disproportionately large number of individuals accessing the particular website from a location that is unexpected and the KL value is a small number when ULB components 173 observes an expected number of individuals in the location are visiting the website. For a single website, the ULB component 173 may calculate high KL values for several different locations.

The ULB component 173 may use the KL values to improve the rank for the website 180. If a website 180 has a KL value above a threshold for the user's location, then the website 180 is promoted in the ranking by the rank component 171. In certain embodiments, the rank component 171 receives the KL value and incorporates the value in a neural network ranking algorithm that factors the query match, term frequency, KL value, and location of the user to assign a rank to the website. Moreover, the ULB component 173 may send the KL values to the correction component 172 to correct user or website locations by including the unexpectedly popular location as one of the correct locations for the website or user. In some embodiments, each website in an index associated with the search engine 120 is tagged with the locations where the KL value exceeds the threshold value.

In an alternate embodiment, the ULB component 173 is configured to analyze anchors pointing to a website obtained from index data. "P(W,L)" is calculated to represent the probability that an anchor pointing to a website "W" is from location "L." "P(L)" is calculated to represent the probability that an anchor for any website is from location "L." For instance, the ULB component 173 may observe that 60% of the anchors pointing to a website are from the United States of America, 30% of the anchors pointing to these websites are from Great Britain, and 10% of the anchors are from elsewhere. In turn, the ULB component 173 calculates the KL divergence value for the website for a particular location and compares the KL divergence value to the threshold value. When the KL divergence value is above the threshold value, the ULB component 173 sends the KL divergence value to the rank component 171 to assign an appropriate rank to the website, and sends the KL divergence value to the correction component 172 to associate the website with a proper location.

The promoter component 174 identifies country, state, and municipality information for a website 180. The municipality information identifies the city, county, or town for the website 180. The promoter component 174 receives location information from different sources selected from the following: Yellow Pages$^{SM}$ data, open directory project (ODP), uniform resource locators, website content, or locations obtained from websites by the ULB component 173 using either log data or anchor data. The Yellow Pages$^{SM}$ data is collected by a third-party and contains the website uniform resource locator and contact information, such as telephone number, state, city, and zip code. The ODP data includes data that is generated by a collection of editors. The editors receive and store contact information for each website that is included in the open directory project. The uniform resource locators or website content are parsed by the promoter component 174 to extract location information. For instance, the promoter component 174 may extract a country component from a uniform resource locator: http://www.va.com.au, the "au" portion of the uniform resource locator means Australia. Alternatively, the uniform resource locator or website content may include terms for a state or city. For instance, a page that has an address for Seattle, Wash. is relevant to the location Seattle, Wash. and is extracted by the promoter component 174.

In turn, the promoter component 174 receives location information from one or more of these sources. In some embodiments, the promoter component 174 assigns a value of "1" to each source and aggregates the assigned value for a number of sources that return similar location information, i.e., state data or municipality data. The number of sources that return similar location information is sent to the rank component 171 to increase the rank for the website corresponding to obtained location information.

In an embodiment, the promoter component 174 sends the location information returned by the at least three sources to the correction component 172 to locate inconsistencies. For instance, the correction component 172 may observe that a website 180 classified with Texas as the location may have a large number of users from Washington state visiting the website 180. The correction component 172 may suggest that the Washington state location is a better location. In turn, the correction component identifier Washington state as the high priority location for the website identifies Texas as a low priority location.

In an embodiment, the search engine 120 updates the index that is used to return results to the user to include one or more locations identified by the location service 170 for each website stored in the index. For instance, the search engine 120 may add "Seattle Wash. USA" to the index for SpaceNeedle.com based on the suggestions from the location service 170. The location service 170 may suggest the location "Seattle Wash. USA" for the website SpaceNeedle.com because the log data 160 indicates that many users in Seattle visit the website SpaceNeedle.com. In some embodiments, the search engine 120 receives updates from the location service 170 and updates the index periodically, i.e., daily, weekly, monthly, or quarterly, etc, without user intervention. Alternatively, the updates may be performed manually after receiving the suggestions from the location service 170.

Accordingly, location service 170 of the search engine may use, among other things, the location database 150, KL divergence values, Yellow Pages$^{SM}$ data, ODP data, page content, and uniform resource locators to identify a location for a website or a user.

One of ordinary skill in the art understands and appreciates the operating environment 100 has been simplified for description purposes and alternate operating environments are within the scope and spirit of the above description.

In certain embodiments, a search engine configured with location services associates a webpage with a location. The location service uses log data having browse activity for users of the search engine. Based on the browse activity the location service identifies a location for the website and returns suggestions that impact the rank assigned to the websites.

Figure 2:
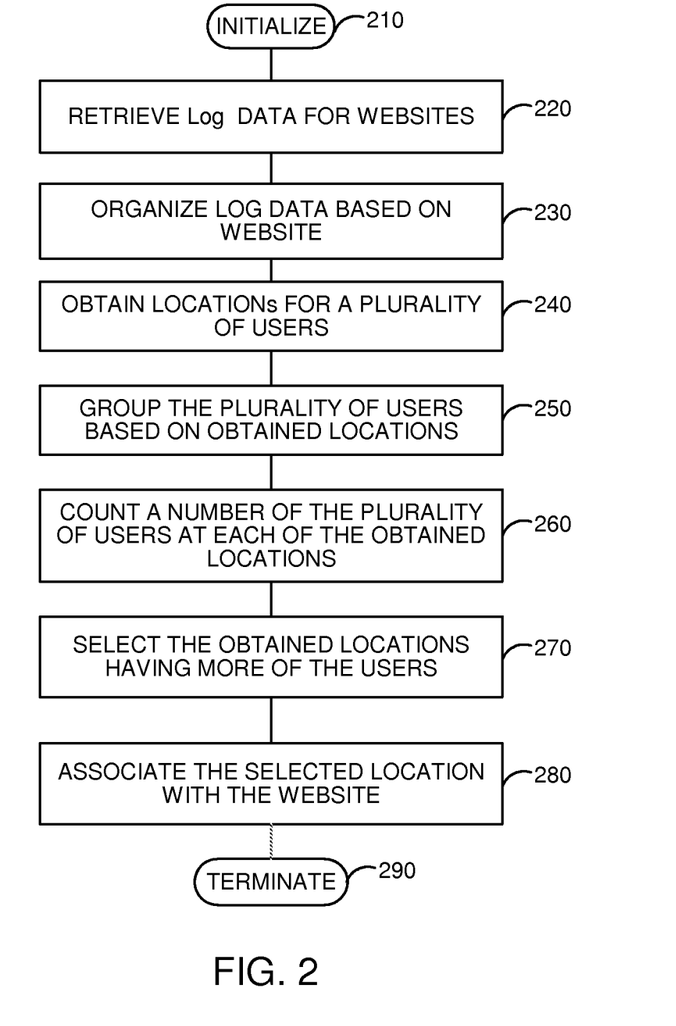
FIG. 2 is a logic diagram that illustrates a computer-implemented method for associating locations with websites based on user locations.

FIG. 2 is a logic diagram that illustrates a computer-implemented method for associating locations with websites based on user locations. The computer-implemented method initiates in step 210. In step 220, the location service of the search engine retrieves log data having uniform resource locators for websites from a plurality of users. The log data comprises tool bar logs and search logs. In turn, the location service organizes the log data based on websites, in step 230. In step 240, for each website, the location service obtains locations for the plurality of users from a location database. In step 250, the location service groups the plurality of users based on the obtained locations. The location service counts a number of the plurality of users at each of the obtained locations, in step 260. In step 270, the location service selects the obtained locations having more of the plurality of users than any other obtained locations. In step 280, the location service associates the selected location with the website. In step 290, the computer-implemented method terminates.

In another embodiment, the search engine configured with the location services associates a webpage with a location. The location service uses index data having anchors pointing to the websites. Based on the anchors pointing to the website, the location service identifies a location for the website, and the identified location impacts the rank assigned to the websites.

Figure 3:
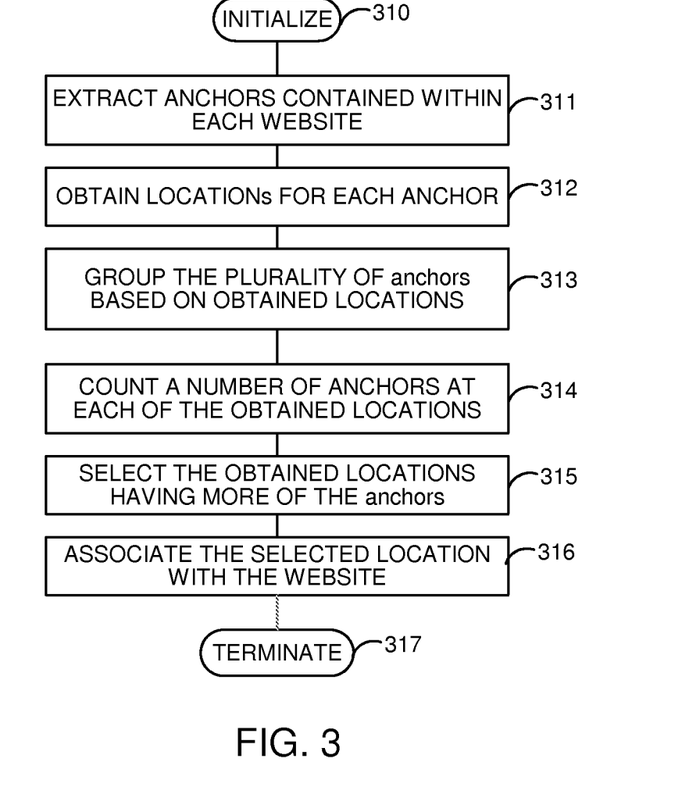
FIG. 3 is a logic diagram that illustrates a computer-implemented method for associating locations with websites based on anchor locations.

FIG. 3 is a logic diagram that illustrates a computer-implemented method for associating locations with websites based on anchor locations. The computer-implemented method initiates in step 310. The location service extracts anchors pointing to each website, in step 311. In step 312, for each website, the location service obtains locations for each anchor from a location database. In step 313, the location service groups the anchors based on the obtained locations. In step 314, the location service counts a number of anchors at each of the obtained locations pointing to the website. In step 315, the location service selects the locations having more anchors than any other obtained location. In step 316, the location service associates the selected location with the website. The computer-implemented method terminates in step 317.

In other embodiments, the search engine configured with the location services alters a rank for a website based on location. The location services uses location information from at least three sources to obtain locations for a website. Based on the overlap and similarity of the locations from the at least three sources, a rank of the website related to the location is increased.

Figure 4:
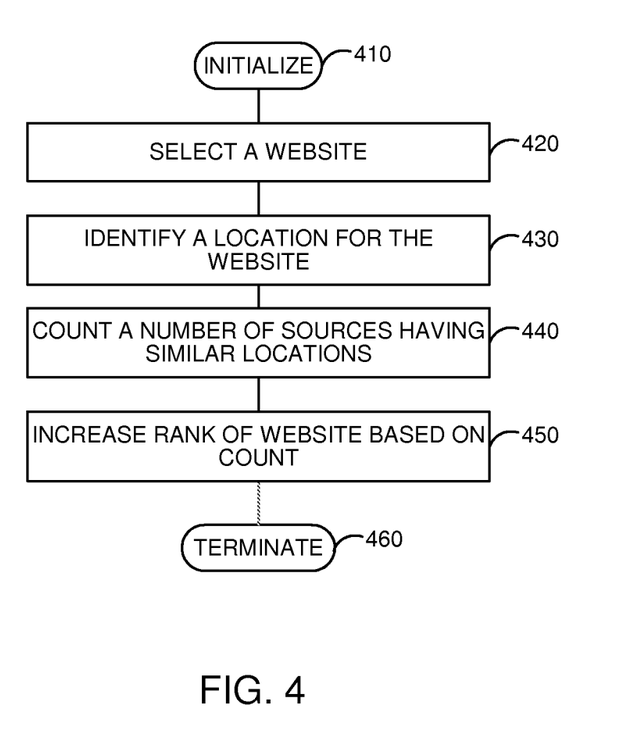
FIG. 4 is a logic diagram that illustrates a computer-implemented method for ranking a website based on location.

FIG. 4 is a logic diagram that illustrates a computer-implemented method for ranking a website based on location. The computer-implemented method initiates in step 410. In step 420, the location service selects a website. In step 430, the location service identifies a location for the website from at least three sources. In step 440, the location service counts a number of sources having similar locations for the website. In step 450, the location service communicates with the search engine to increase a rank—based on the count—for the website in a result set returned to a user that issued a search query to a search engine. The user has a location similar to the identified location of the website. Additionally, in some embodiments, the search query issued by the user may include the identified location. The computer-implemented method terminates in step 460.

In summary, a search engine is configured to identify locations for websites and users and to increase a rank for a website based on the location associated with the website. The search engine is configured to identify, among other things, a country, state, and municipally for each website. Additionally, the search engine may correct inconsistencies for location information of websites or users received from third parties.

The foregoing descriptions of the invention are illustrative, and modifications in configuration and implementation will occur to persons skilled in the art. For instance, while the present invention has generally been described with relation to FIGS. 1-4, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

The invention claimed is:

1. One or more hardware computer memories having computer-executable instructions embodied thereon for a method to associate a location with a website, the method comprising:
retrieving index data having page content for websites;
organizing the index data based on websites;
extracting anchors within each website pointing to targets;
for each website, obtaining anchor geographic locations for each anchor from a location database;
grouping the anchors based on the obtained anchor geographic locations;
counting a number of anchors having each of the obtained anchor geographic locations;
counting a number of users that visit the website;
identifying a user geographic location for each user;
grouping the users based on the identified user geographic location;
selecting the user geographic location having more of the user visits to the website than any other user geographic location;
selecting the obtained anchor geographic location having more of the anchors than any other obtained anchor location;
associating the website with one of: the selected anchor geographic location if anchors and anchor geographic locations are available or user geographic location if anchors and anchor geographic locations are unavailable;
ranking the websites based on the associated location using a Kullback-Leibler divergence, wherein a website is identified as unexpectedly popular when a probability that the users visiting the website from at least one geographic location other than the associated location is greater than a popularity expectation of the associated location, wherein the popularity expectation represents a probability that the users that visit the website are geographically located at the associated location; and
increasing the rank of the website that is identified as unexpectedly popular to be higher in rank than the ranks assigned to other websites that are not identified as unexpectedly popular.

2. The memories of claim 1, wherein the location database is provided by a third-party.

3. The memories of claim 2, further comprising for each anchor, reevaluating the obtained locations based on the associated locations for the websites having the anchors.

4. The memories of claim 3, further comprising updating the obtained location of the anchor to correspond to the associated location of a majority of the websites that the anchor points to.

5. A computer-implemented method to associate a location with a website, the method comprising:
retrieving index data having page content for websites;
organizing the index data based on websites;
extracting anchors within each website pointing to targets;
for each website, obtaining anchor geographic locations for each anchor from a location database;
grouping the anchors based on the obtained anchor geographic locations;
counting a number of anchors having each of the obtained anchor geographic locations;
counting a number of users that visit the website;
identifying a user geographic location for each user;
grouping the users based on the identified user geographic location;
selecting the user geographic location having more of the user visits to the website than any other user geographic location;
selecting the obtained anchor geographic location having more of the anchors than any other obtained anchor location;
associating the website with one of: the selected anchor geographic location if anchors and anchor geographic locations are available or user geographic location if anchors and anchor geographic locations are unavailable;
ranking the websites based on the associated location using a Kullback-Leibler divergence, wherein a website is identified as unexpectedly popular when a probability that the users visiting the website from at least one geographic location other than the associated location is greater than a popularity expectation of the associated location, wherein the popularity expectation represents a probability that the users that visit the website are geographically located at the associated location; and increasing the rank of the website that is identified as unexpectedly popular to be higher in rank than the ranks assigned to other websites that are not identified as unexpectedly popular.

6. The method of claim 5, wherein the location database is provided by a third-party.

7. The method of claim 6, further comprising for each anchor, reevaluating the obtained locations based on the associated locations for the websites having the anchors.

8. The method of claim 7, further comprising updating the obtained location of the anchor to correspond to the associated location of a majority of the websites that the anchor points to.

9. A computer system having hardware computer-readable media and processors configured to perform a method to associate a location with a website, the method comprising:

retrieving index data having page content for websites;

organizing the index data based on websites;

extracting anchors within each website pointing to targets;

for each website, obtaining anchor geographic locations for each anchor from a location database;

grouping the anchors based on the obtained anchor geographic locations;

counting a number of anchors having each of the obtained anchor geographic locations;

counting a number of users that visit the website;

identifying a user geographic location for each user;

grouping the users based on the identified user geographic location;

selecting the user geographic location having more of the user visits to the website than any other user geographic location;

selecting the obtained anchor geographic location having more of the anchors than any other obtained anchor location;

associating the website with one of: the selected anchor geographic location if anchors and anchor geographic locations are available or user geographic location if anchors and anchor geographic locations are unavailable;

ranking the websites based on the associated location using a Kullback-Leibler divergence, wherein a website is identified as unexpectedly popular when a probability that the users visiting the website from at least one geographic location other than the associated location is greater than a popularity expectation of the associated location, wherein the popularity expectation represents a probability that the users that visit the website are geographically located at the associated location; and increasing the rank of the website that is identified as unexpectedly popular to be higher in rank than the ranks assigned to other websites that are not identified as unexpectedly popular.

10. The computer system of claim 9, wherein the location database is provided by a third-party.

11. The computer system of claim 10, further comprising for each anchor, reevaluating the obtained locations based on the associated locations for the websites having the anchors.

12. The computer system of claim 11, further comprising updating the obtained location of the anchor to correspond to the associated location of a majority of the websites that the anchor points to.

* * * * *